(12) United States Patent
Chandhok et al.

(10) Patent No.: US 8,675,631 B2
(45) Date of Patent: Mar. 18, 2014

(54) METHOD AND SYSTEM FOR ACHIEVING FASTER DEVICE OPERATION BY LOGICAL SEPARATION OF CONTROL INFORMATION

(75) Inventors: Ravinder Paul Chandhok, Poway, CA (US); Bruce Collins, San Diego, CA (US); Shusheel Gautam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1497 days.

(21) Appl. No.: 11/369,327

(22) Filed: Mar. 6, 2006

(65) Prior Publication Data

US 2006/0218596 A1 Sep. 28, 2006

Related U.S. Application Data

(60) Provisional application No. 60/660,900, filed on Mar. 10, 2005.

(51) Int. Cl.
*H04J 3/24* (2006.01)

(52) U.S. Cl.
USPC ............... 370/349; 370/394; 725/81; 725/80

(58) Field of Classification Search
None
See application file for complete search history.

(56) References Cited

U.S. PATENT DOCUMENTS

| | | | |
|---|---|---|---|
| 4,739,510 A | 4/1988 | Jeffers et al. | |
| 5,170,413 A | 12/1992 | Hess et al. | |
| 5,323,422 A | 6/1994 | Ushirokawa | |
| 5,490,168 A | 2/1996 | Phillips et al. | |
| 5,555,247 A | 9/1996 | Matsuoka et al. | |
| 5,732,113 A | 3/1998 | Schmidl et al. | |
| 5,848,107 A | 12/1998 | Philips | |
| 6,175,551 B1 | 1/2001 | Awater et al. | |
| 6,209,109 B1 | 3/2001 | Hori et al. | |
| 6,347,071 B1 | 2/2002 | Cupo et al. | |
| 6,498,928 B1 | 12/2002 | Hiramatsu | |
| 6,546,062 B1 | 4/2003 | Du et al. | |
| 6,614,864 B1 | 9/2003 | Raphaeli et al. | |
| 6,628,946 B1 | 9/2003 | Wiberg et al. | |
| 6,650,616 B2 | 11/2003 | Crawford | |
| 6,724,834 B2 | 4/2004 | Garrett et al. | |
| 6,731,594 B1 | 5/2004 | Bohnke | |
| 6,778,591 B2 | 8/2004 | Sato | |
| 6,795,435 B1 * | 9/2004 | Jouppi et al. ............... 370/394 |

(Continued)

FOREIGN PATENT DOCUMENTS

| | | |
|---|---|---|
| CN | 1339878 A | 3/2002 |
| CN | 1371576 A | 9/2002 |

(Continued)

OTHER PUBLICATIONS

International Search Report—PCT/US2006/008800—European Patent Office—Jul. 11, 2006.

(Continued)

*Primary Examiner* — German J Viana Di Prisco
(74) *Attorney, Agent, or Firm* — Arent Fox LLP

(57) ABSTRACT

Provided is a method and system for managing device operations. The method includes dividing control information into two or more portions, each portion being associated with a unique control sequence number. Each of the associated control sequence numbers is examined during an update cycle to determine which of the portions must be updated. The control sequence number includes information related to control information updates.

21 Claims, 11 Drawing Sheets

| TIME | FLOW DESCRIPTION MESSAGE | | | BIN0 (REAL TIME) CONTROL SEQUENCE NUMBER | BIN 1 (NON REAL TIME) CONTROL SEQUENCE NUMBER |
|---|---|---|---|---|---|
| t1 | FLOW ID (CNN) | 100 → | MLC ID 20 TRANSMIT MODE (A) | ① | |
| t2 | FLOW ID | 200 → | MLC ID 30 TRANSMIT MODE (B) | | ① |
| t3 | FLOW ID | 300 → | MLC ID 30 TRANSMIT MODE (C) | | ② |
| t4 | FLOW ID | 600 → | MLC ID 30 TRANSMIT MODE (D) | | ③ |
| t5 | FLOW ID (ESPN) | 700 → | MLC ID 50 TRANSMIT MODE (E) | ② | |

(56) References Cited

U.S. PATENT DOCUMENTS

| | | | |
|---|---|---|---|
| 6,839,339 B1* | 1/2005 | Chuah | 370/349 |
| 6,885,712 B1 | 4/2005 | Celebi | |
| 6,993,083 B1 | 1/2006 | Shirakata et al. | |
| 7,027,540 B2 | 4/2006 | Wilson et al. | |
| 7,058,144 B2 | 6/2006 | Baldwin | |
| 7,110,387 B1 | 9/2006 | Kim et al. | |
| 7,123,669 B2 | 10/2006 | Ye et al. | |
| 7,133,457 B2 | 11/2006 | Singh et al. | |
| 7,177,376 B2 | 2/2007 | Atungsiri et al. | |
| 7,177,378 B2 | 2/2007 | Baldemair et al. | |
| 7,203,894 B2 | 4/2007 | Pan et al. | |
| 7,236,554 B2 | 6/2007 | Gupta et al. | |
| 7,254,196 B2 | 8/2007 | Kriedte et al. | |
| 7,278,071 B2 | 10/2007 | Budde et al. | |
| 7,372,889 B2 | 5/2008 | Atarashi et al. | |
| 7,391,828 B2 | 6/2008 | Liu et al. | |
| 7,411,983 B2 | 8/2008 | Jo et al. | |
| 7,492,700 B2 | 2/2009 | Schmidt | |
| 7,577,087 B2 | 8/2009 | Palin | |
| 7,623,607 B2 | 11/2009 | Vrcelj et al. | |
| 7,751,448 B2 | 7/2010 | Laroia et al. | |
| 8,144,824 B2 | 3/2012 | Vrcelj et al. | |
| 8,165,167 B2 | 4/2012 | Vrcelj et al. | |
| 8,175,123 B2 | 5/2012 | Vrcelj et al. | |
| 8,422,614 B2 | 4/2013 | Vrcelj et al. | |
| 2002/0021700 A1* | 2/2002 | Hata et al. | 370/395.42 |
| 2002/0024991 A1 | 2/2002 | Levin et al. | |
| 2002/0080737 A1 | 6/2002 | Koo et al. | |
| 2002/0110202 A1 | 8/2002 | Wilson et al. | |
| 2003/0043927 A1 | 3/2003 | Suzuki | |
| 2003/0161323 A1 | 8/2003 | Harada et al. | |
| 2003/0193914 A1 | 10/2003 | Lomp et al. | |
| 2003/0218973 A1 | 11/2003 | Oprea et al. | |
| 2004/0120436 A1 | 6/2004 | Qiu | |
| 2004/0146024 A1 | 7/2004 | Li et al. | |
| 2004/0198371 A1* | 10/2004 | Balasubramanian et al. | 455/452.2 |
| 2004/0258092 A1 | 12/2004 | Sugaya | |
| 2005/0041681 A1 | 2/2005 | Lee et al. | |
| 2005/0063298 A1 | 3/2005 | Ling et al. | |
| 2005/0163258 A1 | 7/2005 | Gore et al. | |
| 2005/0180533 A1 | 8/2005 | Hamman | |
| 2005/0207365 A1* | 9/2005 | Balachandran et al. | 370/312 |
| 2005/0249181 A1 | 11/2005 | Vijayan et al. | |
| 2006/0018413 A1 | 1/2006 | Gupta | |
| 2006/0114815 A1 | 6/2006 | Hasegawa et al. | |
| 2006/0141933 A1 | 6/2006 | Smee et al. | |
| 2006/0205356 A1 | 9/2006 | Laroia et al. | |
| 2006/0221810 A1 | 10/2006 | Vrcelj et al. | |
| 2006/0233269 A1 | 10/2006 | Bhushan et al. | |
| 2006/0250939 A1 | 11/2006 | Wang et al. | |
| 2006/0251028 A1 | 11/2006 | Nagata et al. | |
| 2007/0069953 A1 | 3/2007 | Ling et al. | |
| 2007/0140322 A1 | 6/2007 | Wang et al. | |
| 2007/0211765 A1 | 9/2007 | Vrcelj et al. | |
| 2008/0260008 A1 | 10/2008 | Vrcelj et al. | |
| 2010/0157833 A1 | 6/2010 | Vrcelj et al. | |
| 2010/0246564 A1 | 9/2010 | Vrcelj et al. | |

FOREIGN PATENT DOCUMENTS

| | | |
|---|---|---|
| CN | 1448015 A | 10/2003 |
| CN | 101189847 A | 5/2008 |
| CN | 101310555 A | 11/2008 |
| CN | 101316160 A | 12/2008 |
| EP | 0915597 A1 | 5/1999 |
| EP | 0 999 671 A2 | 5/2000 |
| EP | 1178642 A2 | 2/2002 |
| EP | 1180870 | 2/2002 |
| EP | 1320208 A2 | 6/2003 |
| EP | 1416693 A2 | 5/2004 |
| EP | 1 439 668 A2 | 7/2004 |
| GB | 2365714 | 2/2002 |
| GB | 2395094 A | 5/2004 |
| JP | 10135926 A | 5/1998 |
| JP | 10224318 A | 8/1998 |
| JP | 11194943 A | 7/1999 |
| JP | 2001069119 A | 3/2001 |
| JP | 2001119368 A | 4/2001 |
| JP | 2001251273 A | 9/2001 |
| JP | 2002-044548 | 2/2002 |
| JP | 2002171238 A | 6/2002 |
| JP | 2003510952 T | 3/2003 |
| JP | 2003110519 A | 4/2003 |
| JP | 2003518826 T | 6/2003 |
| JP | 2004153831 A | 5/2004 |
| JP | 2004-304214 | 10/2004 |
| JP | 2004282730 A | 10/2004 |
| JP | 2004343732 | 12/2004 |
| JP | 2005-027167 | 1/2005 |
| JP | 2005-039764 | 2/2005 |
| JP | 2005057575 A | 3/2005 |
| JP | 2005057673 | 3/2005 |
| JP | 2005527154 | 9/2005 |
| KR | 20050010834 | 1/2005 |
| RU | 2235429 | 8/2004 |
| TW | 400675 B | 8/2000 |
| TW | 451572 B | 8/2001 |
| TW | 543329 | 7/2003 |
| TW | 560153 | 11/2003 |
| TW | 571543 | 1/2004 |
| TW | 200705911 | 2/2007 |
| TW | 321809 | 11/2007 |
| WO | 9707620 A1 | 2/1997 |
| WO | 0049782 A2 | 8/2000 |
| WO | WO0072609 | 11/2000 |
| WO | 0077961 A1 | 12/2000 |
| WO | 0147204 A1 | 6/2001 |
| WO | 0233838 | 4/2002 |
| WO | WO 03/096717 A1 | 11/2003 |
| WO | 2005002164 A1 | 1/2005 |
| WO | 2005050865 A2 | 6/2005 |

OTHER PUBLICATIONS

Written Opinion—PCT/US2006/008800—European Patent Office, Munich—Jul. 11, 2006.

International Preliminary Report on Patentability—PCT/US2006/008800—The International Bureau of WIPO—Sep. 12, 2007.

European Search Report—EP10180110,Search Authority—Munich Patent Office, Nov. 4, 2010.

Lawrence Berkeley National Laboratory, Jan. 26-29, 1998, Vern Paxson, Bro: A System for Detecting Network Intruders in Real-Time.

Taiwan Search Report—TW095108157—TIPO—Sep. 19, 2011.

Khan, "Low-complexity ML channel estimation schemes for OFDM," 2005 13th IEEE International Conference on Networks, 2005. Jointly held with the 2005 IEEE 7th Malaysia International Conference on Communication, vol. 2, Nov. 16-18, 2005, pp. 607-612.

Yamazaki, et al., "A Timing Synchronization Scheme for OFDM," Technical Report of the Institute of Electronics, Information, and Communication Engineers, Jun. 21, 2002, pp. 55-60, vol. 102(150), RCS 2002-84.

Yang, et al., "Timing Recovery for OFDM Transmission", Nov. 2000, IEEE, p. 2278-2284.

Zhou, et al., "Real-Time ISI free window tracking scheme for ofdm systems," Vehicular Technology Conference, 2004, VTC2004-Fall. 2004 IEEE 60th Los Angeles, CA, USA Sep. 26-29, 2004, Piscataway, NJ, USA, IEEE Sep. 26, 2004, pp. 4325-4329, XP010790237.

\* cited by examiner

| FLOW DESCRIPTION MESSAGE | | CONTROL SEQUENCE NUMBER |
|---|---|---|
| FLOW ID 100 (CNN) | → MLC ID 20 TRANSMIT MODE (A) | ① |
| FLOW ID 200 | → MLC ID 30 TRANSMIT MODE (B) | ② |
| FLOW ID 300 | → MLC ID 30 TRANSMIT MODE (C) | ③ |
| FLOW ID 600 | → MLC ID 30 TRANSMIT MODE (D) | ④ |
| FLOW ID 700 (ESPN) | → MLC ID 50 TRANSMIT MODE (E) | ⑤ |

500

FIG. 5
(Conventional)

| TIME | FLOW DESCRIPTION MESSAGE | | BIN0 (REAL TIME) CONTROL SEQUENCE NUMBER | BIN 1 (NON REAL TIME) CONTROL SEQUENCE NUMBER |
|---|---|---|---|---|
| t1 | FLOW ID 100 (CNN) → | MLC ID 20 TRANSMIT MODE (A) | ① | |
| t2 | FLOW ID 200 → | MLC ID 30 TRANSMIT MODE (B) | | ① |
| t3 | FLOW ID 300 → | MLC ID 30 TRANSMIT MODE (C) | | ② |
| t4 | FLOW ID 600 → | MLC ID 30 TRANSMIT MODE (D) | | ③ |
| t5 | FLOW ID 700 (ESPN) → | MLC ID 50 TRANSMIT MODE (E) | ② | |

FIG. 7

METHOD AND SYSTEM FOR ACHIEVING FASTER DEVICE OPERATION BY LOGICAL SEPARATION OF CONTROL INFORMATION

CROSS-REFERENCE TO RELATED APPLICATIONS

The present Application claims priority under 35 U.S.C. §119 to Provisional Application No. 60/660,900, filed on Mar. 10, 2005, and assigned to the assignee hereof and hereby expressly incorporated by reference herein.

BACKGROUND

1. Field of the Invention

The present invention relates to transmission efficiency in a communications network. More specifically, the present invention relates to improving device latency in a wireless communications network.

2. Background Art

FLO is a technology designed primarily for the efficient and economical distribution of the same multimedia content to millions of wireless subscribers simultaneously. The goal of FLO technology is to reduce costs associated with delivering such content and allow users to surf channels of content on the mobile handsets typically used for traditional cellular voice and data services. This multimedia content is also known as services. A service is an aggregation of one or more independent data components. Each independent data component of a service is called a flow.

Services are classified into two types based on their coverage: Wide-area services and Local-area services. A Local-area service is multicast for reception within a metropolitan area. By contrast, Wide-area services are multicast in one or more metropolitan areas.

FLO services are carried over one or more logical channels, known as MediaFLO™ Logical Channels or MLCs. An MLC may be divided into a maximum of three logical sub-channels. These logical sub-channels are called streams. Each flow is carried in a single stream.

In order to properly operate a device in a Wide-area services or a Local-area service based network, the device must acquire current control information broadcasts from the network. For various reasons, it is difficult for the device to reliably execute all of its operations before acquiring accurate control information. Because of this unreliability, the latency of some of the device's operations may be proportionately increased by the time it takes the device to acquire the most up-to-date and current control information.

What is needed, therefore, is a method and system to improve the latency of device execution of operations that are dependent on having the most current and up-to-date control information.

BRIEF SUMMARY

Consistent with the principles of the present invention as embodied and broadly described herein, the present invention includes a method for managing device operations. The method includes dividing control information into two or more portions, each portion being associated with a unique control sequence number. Each of the associated control sequence numbers is examined during an update cycle to determine which of the portions must be updated.

Another aspect includes a computer readable medium carrying one or more sequences of one or more instructions for execution by one or more processors to perform a method managing device operation. The instructions when executed by the one or more processors, cause the one or more processors to perform the step of dividing control information into two or more portions, each portion being associated with a unique control sequence number. The one or more processors also examine each of the control sequence numbers during an update cycle to determine which of the portions must be updated.

Yet another aspect includes an apparatus for managing device operation. The apparatus includes means for receiving control information that is divided into two or more portions, each portion being associated with a unique control sequence number. The apparatus also includes means for examining each of the received control sequence numbers for changes and means for updating the portion of the received control information corresponding to a changed control sequence number.

Still another aspect includes a device having a processor. The processor includes first and second logic portions wherein the first logic portion is configured to receive control information, the control information being divided into two or more portions, each portion being associated with a unique control sequence number. The second logic portion is configured to examine each of the control sequence numbers during an update cycle to determine which of the portions must be updated.

The present invention improves latency in a communications device by logically dividing control information, transmitted by the network, into separate bins. Depending on whether the control information relates to real-time or non-real-time media, the control information in the device is updated in a manner to avoid interrupting the media communication. The latency of execution of operations, that depend on having accurate control information, is reduced by broadcasting the control information needed for latency sensitive device operations separately (i.e., in a separate bin) from control information needed for other device operations.

Further features and advantages of the present invention as well as the structure and operation of various embodiments of the present invention, are described in detail below with reference to the accompanying drawings.

BRIEF DESCRIPTION OF THE DRAWINGS

The accompanying drawings, which are incorporated herein and constitute part of the specification, illustrate embodiments of the present invention and, together with the general description given above and the detailed description of the embodiments given below, serve to explain the principles of the invention. In the drawings:

FIG. 5 is an illustration of a conventional relationship between a flow, a stream, and a MediaFlo logical channel (MLC);

FIG. 7 is an illustration of an exemplary flow description message constructed in accordance with the embodiment;

DETAILED DESCRIPTION

Figure 1:
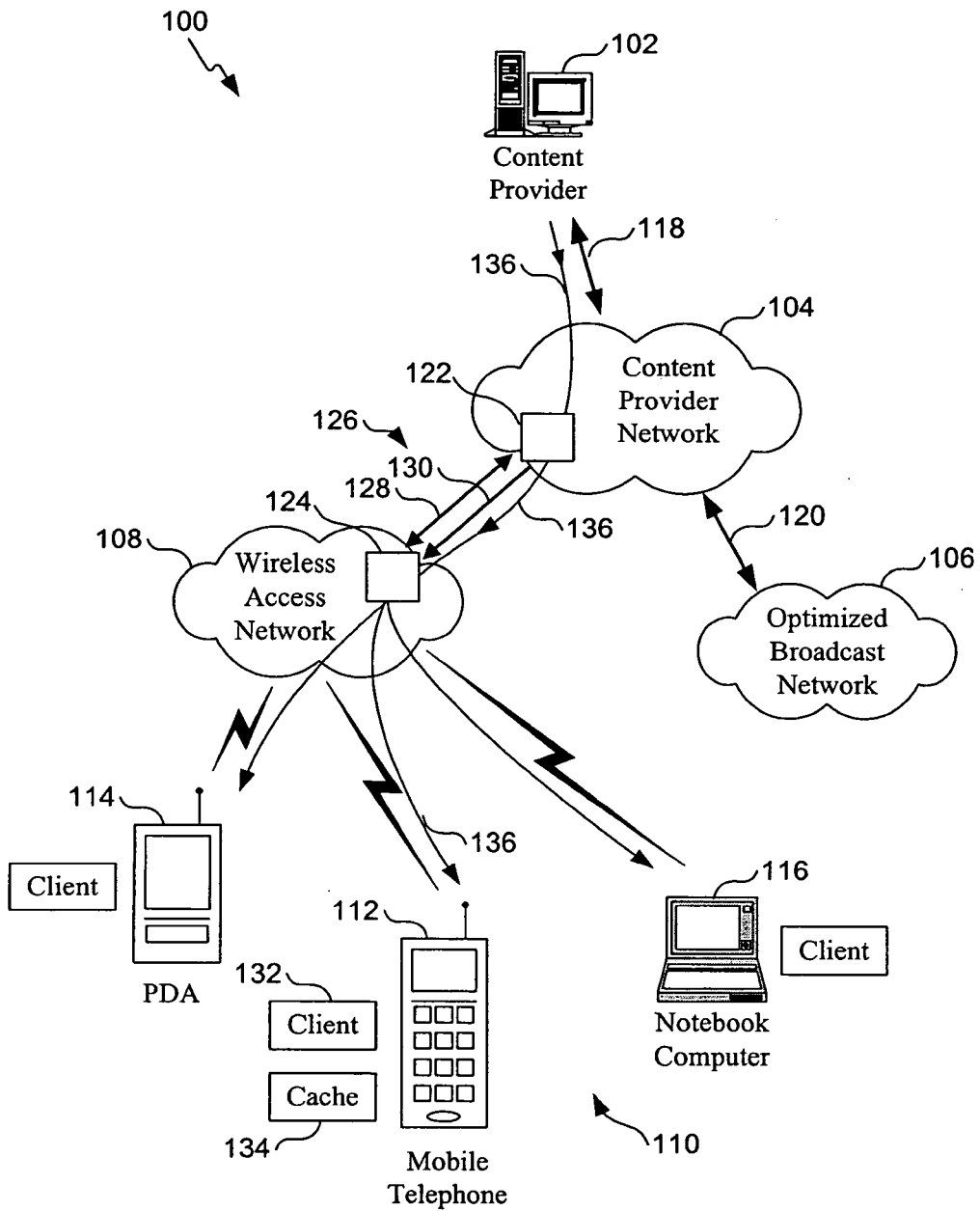
FIG. 1 is an illustration of a network including one embodiment of a content delivery system.

The following detailed description of the present invention refers to the accompanying drawings that illustrate exemplary embodiments consistent with this invention. Other embodiments are possible, and modifications may be made to the embodiments within the spirit and scope of the invention. Therefore, the following detailed description is not meant to limit the invention. Rather, the scope of the invention is defined by the appended claims.

This specification discloses one or more embodiments that incorporate the features of this invention. The disclosed embodiment(s) merely exemplify the invention. The scope of the invention is not limited to the disclosed embodiment(s). The invention is defined by the claims appended hereto.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

It would be apparent to one skilled in the art that the present invention, as described below, may be implemented in many different embodiments of hardware, software, firmware, and/or the entities illustrated in the drawings. Any actual software code with the specialized controlled hardware to implement the present invention is not limiting of the present invention. Thus, the operation and behavior of the present invention will be described with the understanding that modifications and variations of the embodiments are possible, given the level of detail presented herein.

FIG. 1 shows a communication network 100 that comprises a transport system 136 that operates to create and transport multimedia content flows across data networks. For example, the transport system 136 is consistent with the principles of the FLO system, noted above, and is suitable for use in transporting content clips from a content provider network to a wireless access network for broadcast distribution.

The network 100 comprises a content provider (CP) 102, a content provider network 104, an optimized broadcast network 106, and a wireless access network 108. The network 100 also includes devices 110 that comprise a mobile telephone 112, a personal digital assistance (PDA) 114, and a notebook computer 116. The devices 110 illustrate just some of the devices that are suitable for use with the transport system 136. It should be noted that although three devices are shown in FIG. 1, virtually any number of analogous devices, or types of devices are suitable for use in the transport system 136, as would be apparent to those skilled in the relevant art.

The content provider 102 operates to provide content for distribution to users in the network 100. The content comprises video, audio, multimedia content, clips, real-time and non real-time content, scripts, programs, data or any other type of suitable content. The content provider 102 provides the content to the content provider network 104 for distribution. For example the content provider 102 communicates with the content provider network 104 via the communication link 118, which comprises any suitable type of wired and/or wireless communication link.

The content provider network 104 comprises any combination of wired and wireless networks that operate to distribute content for delivery to users. The content provider network 104 communicates with the optimized broadcast network 106 via the link 120. The link 120 comprises any suitable type of wired and/or wireless communication link. The optimized broadcast network 106 comprises any combination of wired and wireless networks that are designed to broadcast high quality content. For example, the optimized broadcast network 106 may be a specialized proprietary network that has been optimized to deliver high quality content to selected devices over a plurality of optimized communication channels.

The transport system 136 operates to deliver content from the content provider 102 for distribution to a content server (CS) 122 at the content provider network 104 that operates to communicate with a broadcast base station (BBS) 124 at the wireless access network. The CS 122 and the BBS 124 communicate using one or more embodiments of a transport interface 126 that allows the content provider network 104 to deliver content in the form of content flows to the wireless access network 108 for broadcast/multicast to the devices 110. The transport interface 126 comprises a control interface 128 and a bearer channel 130. The control interface 128 operates to allow the CS 122 to add, change, cancel, or otherwise modify contents flows that flow from the content provider network 104 to the wireless access network 108. The bearer channel 130 operates to transport the content flows from the content provider network 104 to the wireless access network 108.

The CS 122 uses the transport interface 126 to schedule a content flow to be transmitted to the BBS 124 for broadcast/multicast over the wireless access network 108. For example, the content flow may comprise a non real-time content clip that was provided by the content provider 102 for distribution using the content provider network 104. The CS 122 operates to negotiate with the BBS 124 to determine one or more parameters associated with the content clip. Once the BBS 124 receives the content clip, it broadcasts/multicasts the content clip over the wireless access network 108 for reception by one or more of the devices 110. Any of the devices 110 may be authorized to receive the content clip and cache it for later viewing by the device user.

In the foregoing example, the device 110 comprises a client program 132 that operates to provide a program guide that displays a listing of content that is scheduled for broadcast over the wireless access network 108. The device user may then select to receive any particular content for rendering in real-time or to be stored in a cache 134 for later viewing. For example the content clip may be scheduled for broadcast during the evening hours, and the device 112 operates to receive the broadcast and cache the content clip in the cache 134 so that the device user may view the clip the next day. Typically, the content is broadcast as part of a subscription service and the receiving device may need to provide a key or otherwise authenticate itself to receive the broadcast.

The transport system 136 allows the CS 122 to receive program-guide records, program contents, and other related information from content provider 102. The CS 122 updates and/or creates content for delivery to devices 110.

Figure 2:
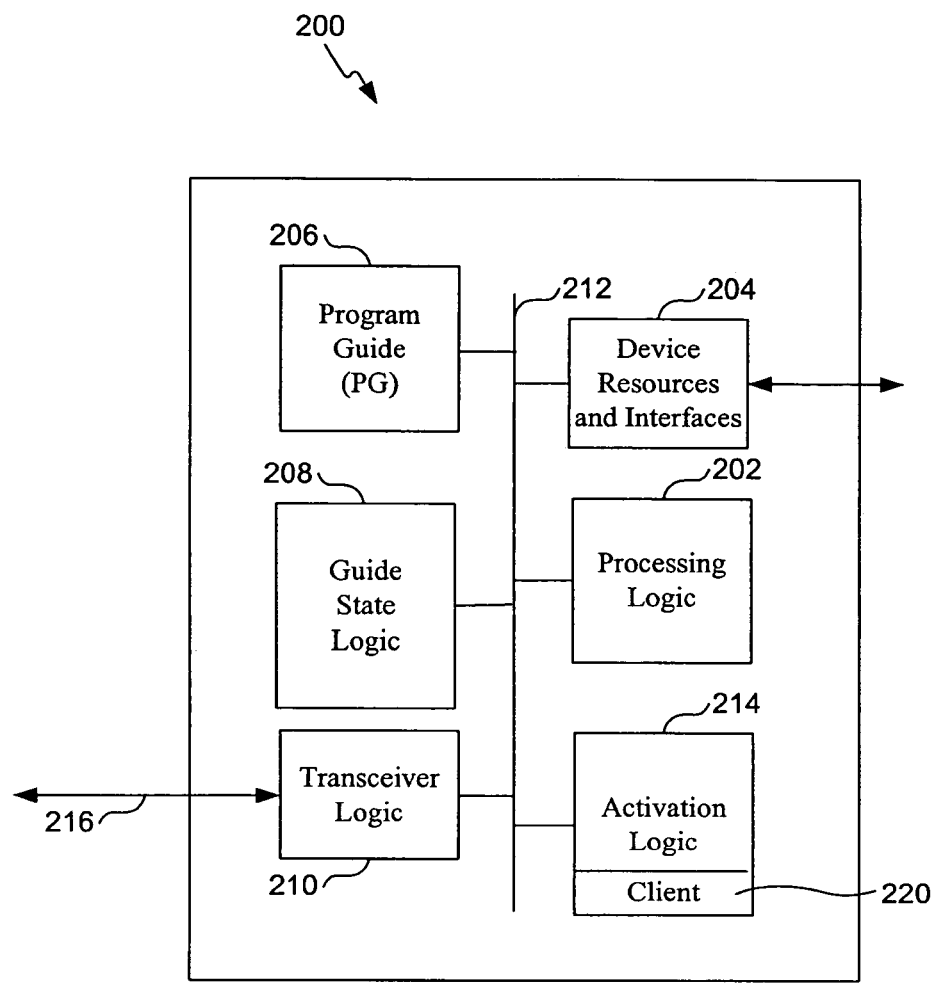
FIG. 2 is an illustration of one embodiment of a content provider suitable for use in the embodiment of the content delivery system of FIG. 1.

FIG. 2 shows a content provider server 200 suitable for use in the content delivery system. For example, the server 200 may be used as the server 102 in FIG. 1. The server 200 comprises processing logic 202, resources and interfaces 204, and transceiver logic 210, all coupled to an internal data bus 212. The server 200 also comprises activation logic 214, PG 206, and Guide State logic 208, which are also coupled to the data bus 212.

The processing logic 202 comprises a central processing unit (CPU), processor, gate array, hardware logic, memory elements, virtual machine, software, and/or any combination of hardware and software. Thus, the processing logic 202 generally comprises logic to execute machine-readable instructions and to control one or more other functional elements of the server 200 via the internal data bus 212.

The resources and interfaces 204 comprise hardware and/or software that allow the server 200 to communicate with internal and external systems. For example, the internal systems may include mass storage systems, memory, display driver, modem, or other internal device resources. The external systems may include user interface devices, printers, disk drives, or other local devices or systems.

The transceiver logic 210 comprises hardware logic and/or software that operates to allow the server 200 to transmit and receive data and/or other information with remote devices or systems using communication channel 216. For example, the communication channel 216 comprises any suitable type of communication link to allow the server 200 to communicate with a data network.

The activation logic 214 comprises a CPU, processor, gate array, hardware logic, memory elements, virtual machine, software, and/or any combination of hardware and software. The activation logic 214 operates to activate a CS and/or a device to allow the CS and/or the device to select and receive content and/or services described in the PG 206. The activation logic 214 transmits a client program 220 to the CS and/or the device during the activation process. The client program 220 runs on the CS and/or the device to receive the PG 206 and display information about available content or services to the device user. Thus, the activation logic 214 operates to authenticate a CS and/or a device, download the client 220, and download the PG 206 for rendering on the device by the client 220.

The PG 206 comprises information in any suitable format that describes content and/or services that are available for devices to receive. For example, the PG 206 may be stored in a local memory of the server 200 and may comprise information such as content or service identifiers, scheduling information, pricing, and/or any other type of relevant information. The PG 206 comprises one or more identifiable sections that are updated by the processing logic 202 as changes are made to the available content or services.

The Guide State Logic 208 comprises hardware and/or software that operates to generate notification messages that identify and/or describe changes to the PG 206. For example, when the processing logic 202 updates the PG 206, the Guide State logic 208 is notified about the changes. The Guide State logic 208 then generates one or more notification messages that are transmitted to CSs, which may have been activated with the server 200, so that these CSs are promptly notified about the changes to the PG 206.

As part of the content delivery notification message, a broadcast indicator is provided that indicates when a section of the PG identified in the message will be broadcast. For example, the broadcast indicator may comprise one bit to indicate that the section will be broadcast and a time indicator that indicates when the broadcast will occur. Thus, the CSs and/or the devices wishing to update their local copy of the Guide State Logic 208 can listen for the broadcast at the designated time to receive the updated section of the Guide State Logic 208.

In one embodiment, the content delivery notification system comprises program instructions stored on a computer-readable media, which when executed by a processor, for instance, the processing logic 202, provides the functions of the server 200 described herein. For example, the program instructions may be loaded into the server 200 from a computer-readable media, such as a floppy disk, CDROM, memory card, FLASH memory device, RAM, ROM, or any other type of memory device or computer-readable media that interfaces to the server 200 through the resources 204. In another embodiment, the instructions may be downloaded into the server 200 from an external device or network resource that interfaces to the server 200 through the transceiver logic 210. The program instructions, when executed by the processing logic 202, provide a guide state notification system as described herein.

Figure 3:
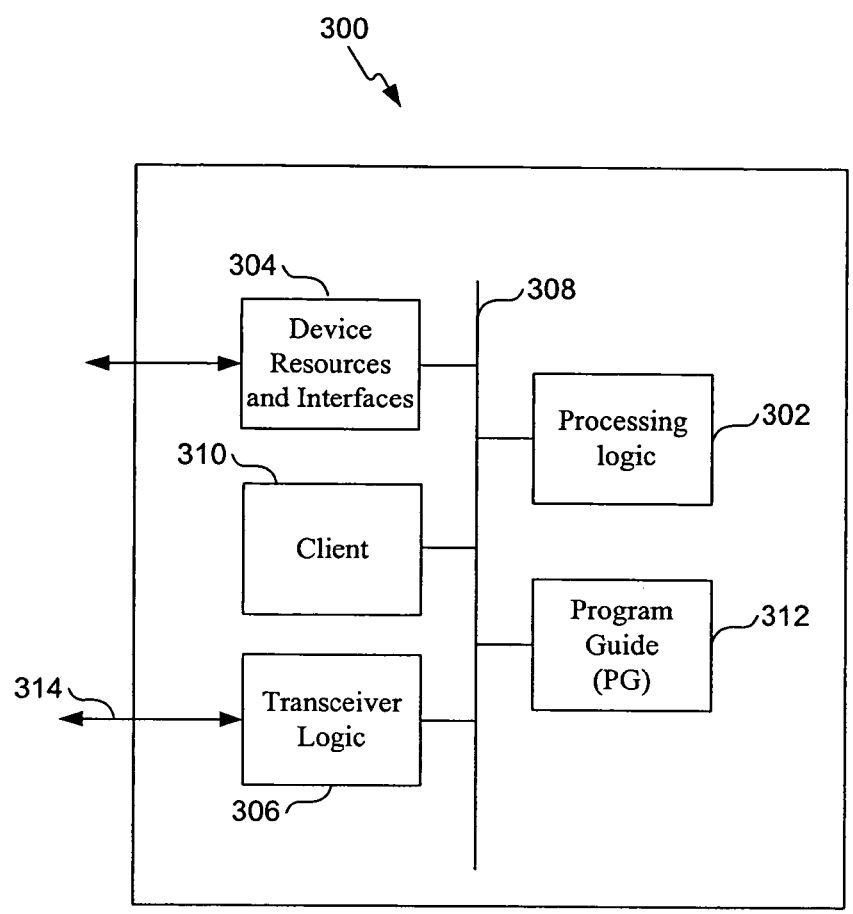
FIG. 3 is an illustration of one embodiment of a content server suitable for use in the embodiment of the content delivery system.

FIG. 3 shows a content server (CS) or device 300 suitable for use in a content delivery system. For example, CS 300 may be the CS 122 shown in FIG. 1. The CS 300 comprises processing logic 302, resources and interfaces 304, and transceiver logic 306, all coupled to a data bus 308. The CS 300 also comprises a client 310, and a PG logic 312, which are also coupled to the data bus 308.

The processing logic 302 comprises a CPU, processor, gate array, hardware logic, memory elements, virtual machine, software, and/or any combination of hardware and software. Thus, the processing logic 302 generally comprises logic configured to execute machine-readable instructions and to control one or more other functional elements of the CS 300 via the internal data bus 308.

The resources and interfaces 304 comprise hardware and/or software that allow the CS 300 to communicate with internal and external systems. For example, internal systems may include mass storage systems, memory, display driver, modem, or other internal device resources. The external systems may include user interface devices, printers, disk drives, or other local devices or systems.

The transceiver logic 306 comprises hardware and/or software that operate to allow the CS 300 to transmit and receive data and/or other information with external devices or systems through communication channel 314. For example, the communication channel 314 may comprise a network communication link, a wireless communication link, or any other type of communication link.

During operation, the CS 300 is activated so that it may receive available content or services over a data network. For example, the CS 300 identifies itself to a content provider server during an activation process. As part of the activation process, the CS 300 receives and stores PG records by PG logic 312. The PG 312 contains information that identifies content or services available for the CS 300 to receive. The client 310 operates to render information in the PG logic 312 on the CS and/or the device 300 using the resources and interfaces 304. For example, the client 310 renders information in the PG logic 312 on a display screen that is part of the device. The client 310 also receives user input through the resources and interfaces so that a device user may select content or services.

The CS 300 receives notification messages through the transceiver logic 306. For example, the messages may be broadcast or unicast to the CS 300 and received by the transceiver logic 306. The PG notification messages identify updates to the PG records at the PG logic 312. In one embodiment, the client 310 processes the PG notification messages to determine whether the local copy at the PG logic 312 needs to be updated. For example, in one embodiment, the notification messages include a section identifier, start time, end time, and version number.

The CS 300 operates to compare the information in the PG notification messages to locally stored information at the existing PG logic 312. If the CS 300 determines from the PG notification messages that one or more sections of the local copy at the PG logic 312 needs to be updated, the CS 300 operates to receive the updated sections of the PG in one of several ways. For example, the updated sections of the PG may be broadcast at a time indicated in the PG notification messages, so that the transceiver logic 306 may receive the broadcasts and pass the updated sections to the CS 300, which in turn updates the local copy at the PG logic 312.

The CS 300 determines which sections of the PG need to be updated based on the received PG update notification messages, and transmits a request to a CP server to obtain the desired updated sections of the PG. For example, the request may be formatted using any suitable format and comprise information such as a requesting CS identifier, section identifier, version number, and/or any other suitable information.

The CS 300 performs one or more of the following functions in one or more embodiments of a PG notification system. It should be noted that the following functions might be changed, rearranged, modified, added to, deleted, or otherwise adjusted within the scope of the invention.

1. The CS is activated for operation with a content provider system to receive content or services. As part of the activation process, a client and PG are transmitted to the CS.

2. One or more PG notification messages are received by the CS and used to determine if one or more sections of the locally stored PG need to be updated.

3. In one embodiment, if the CS determines that one or more sections of the locally stored PG need to be updated, the CS listens to a broadcast from the distribution system to obtain the updated sections of the PG that it needs to update its local copy.

4. In another embodiment, the CS transmits one or more request messages to the CP to obtain the updated sections of the PG it needs.

5. In response to the request, the CP transmits the updated sections of the PG to the CS.

6. The CS uses the received updated sections of the PG to update its local copy of the PG.

The content delivery system comprises program instructions which may be stored on a computer-readable media, which when executed by a processor, such as the processing logic 302, provides the functions of the content delivery notification system as described herein. For example, instructions may be loaded into the CS 300 from a computer-readable media, such as a floppy disk, CDROM, memory card, FLASH memory device, RAM, ROM, or any other type of memory device or computer-readable media that interfaces to the CS 300 through the resources and interfaces 304. In another embodiment, the instructions may be downloaded into the CS 300 from a network resource that interfaces to the CS 300 through the transceiver logic 306. The instructions, when executed by the processing logic 302, provide a content delivery system as described herein.

It should be noted that the CS 300 represents just one implementation and that other implementations are possible within the scope of the invention.

Figure 4:
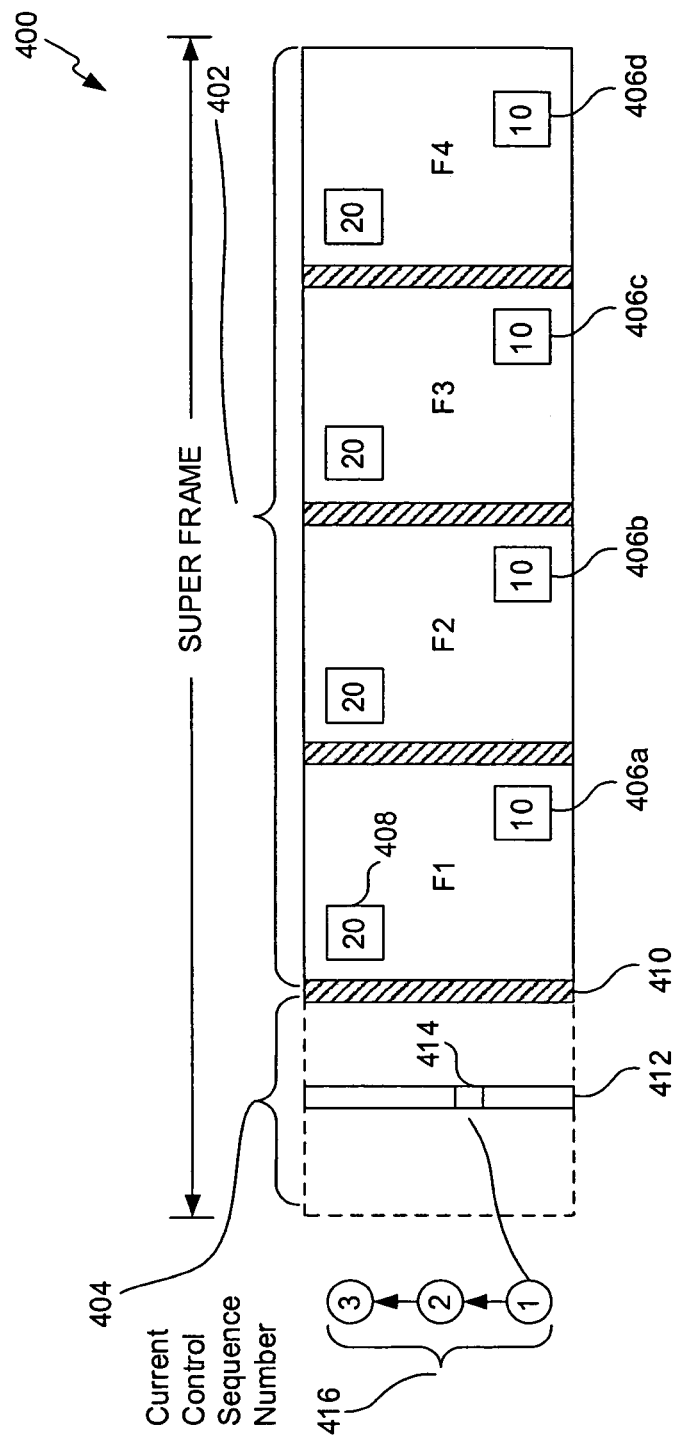
FIG. 4 is an illustration of a representative super-frame of a transmitted signal within a network.

FIG. 4 is an illustration of a representative super-frame 400 of a transmitted signal within the network 100. For purposes of illustration, signal transmission throughout the network 100 can occur in accordance with orthogonal frequency division multiplexing (OFDM) principles. Transmitted signals in the network 100 are organized into super-frames, which are units of data transmission in a physical layer of the network 100. As well understood by those of skill in the art, the network physical layer provides the channel structure, frequency, power output, modulation and encoding specification for the network's forward link.

As mentioned above, the FLO based network 100 multicasts several services as an aggregation of one or more independent data components. Each independent data component is called a flow and can include a video component, audio component, and/or text or signaling components of a service. FLO services are carried over one or more logical channel MLCs.

In the exemplary illustration of FIG. 4, the representative super-frame 400 includes a data portion 402 and an overhead portion 404. The data portion 402 is further subdivided to include data frames F1-F4. At the physical layer of the network 100, MLCs are transported within the data portion 402. As a practical matter, a transported MLC will be divided across the data frames F1-F4. In the exemplary data portion 402 of FIG. 4, two MLCs (10 and 20) are divided across the data frames F1-F4. That is, one fourth of the content of each of the MLCs 10 and 20 is carried in each of the frame F1-F4, respectively.

For example, the MLC having identification (ID) 10 is divided into portions 406a-406d, each corresponding to one of the frames F1-F4. The frame F1 also includes MLC portion 408, which corresponds to the MLC 20, in addition to the portion 406a, which corresponds to the MLC 10.

Also, within the data portion 402, each of the frames F1-F4 of the super-frame 400 includes a control channel 410 that carries important information regarding transmission characteristics of a respective portion of the MLCs (e.g. MLCs 10 and 20) included within the frame.

The overhead portion 404 of the super-frame 400 includes an overhead information symbols (OIS) channel 412. The OIS channel 412, among other things, informs the device 112 of the location of the MLC 10 within the super-frame 400. Thus, when the device 112 initially requests service, it must first decode the OIS channel 412 within the super-frame 400 to know the precise location, and other characteristics, related to the MLC 10 before data within the MLC 10 can be unpacked and used.

Also within the exemplary super-frame 400, the control channel 412 includes a control number field 414 which records changes of control sequence numbers 416. The control sequence number conveys when changes have occurred in services broadcast by the network 100. This concept will be more fully discussed below.

When the device 112 is initially activated, it will receive the OIS channel 412 within the super-frame 400 in accordance with apriorily known control characteristics. Receiving the OIS channel 412 enables the device 112 to obtain information regarding MLCs of interest and regarding receiving and decoding the control channel 410. The device 112 then receives the control channel 410, and in turn, receives information regarding how to receive and decode a specific MLC of interest.

This MLC related information can include, for example, an MLC-to-flow mapping. The device 112 then stores this information in its local cache memory, for example, and proceeds to receive and decode the specific MLC. This specific MLC of interest might be related to a requested flow service provided, for example, by the cable news network (CNN).

Once the device 112 begins receiving the MLC of interest, it does not need to continue monitoring the control channel 410 during subsequent super-frames. The device 112 will continue to monitor the OIS channel 412 to determine, among other things, the specific location of the MLC of interest within a current super-frame. However, the device 112 can rely on the information stored in its local cache memory for receiving all of the other information related to the MLC that would ordinarily be obtained by receiving and decoding the control channel 410.

Subsequent to receiving the MLC of interest, the only time the device 112 will need to receive and decode the control channel 410 is when the MLC of interest, or information related thereto, changes. This change can be dictated, for example, by the network 100.

When the network 100 initially provides a service, the control sequence number is set to an initial value such as the value "1," as reflected in the control sequence number array 416. As the device 112 continues to receive the requested flow service CNN, the device 112 continues to monitor the OIS channel 412 at the beginning of each received super-frame.

If, on the other hand, a different flow service is requested by the device 112, such as the entertainment and sports programming network (ESPN), the device 112 will be required to receive and decode the control channel 412 to obtain specific information related to an ESPN related MLC. Before the device 112 can begin the process of receiving this new service, however, the device 112 will check the array 416 to determine whether the current control sequence number has changed and whether the information stored in its local cache memory matches the current control sequence number within the array 416.

In checking to determine whether the control sequence array 416 has changed, the device 112 will first check the information stored in its cache memory to determine the current sequence number. It will then compare this current number to the most recent number reflected in the control sequence array 416. If the compared numbers are different, the device 112 knows that its local cache memory requires updating before any new service requests can be implemented.

In the example above, the sequence number within the array 416 was set to an initial value of "1," as the network 100 first began providing services to the device 112. However, unbeknownst to the user, the network 100 may have downloaded additional service information to the device 112 in background mode, for example. The downloading of these additional service in background mode would have triggered a change in the MLC, ultimately resulting in the sequence number changing from "1" to "2," to reflect the new service.

When the device 112 checks the array 416 and determines that the control sequence number has changed from "1" to "2," before providing the requested ESPN service, the device 112 will have to (i) receive and decode the control channel 412, (ii) download information (e.g., flow to MLC mapping) associated with the updated sequence number, and (iii) update its local cache memory to reflect the newly downloaded information. Thus, although the user did not specifically request a new service, since this service was nonetheless downloaded (e.g., in background mode) to the device 112, the user must wait for the device 112 to update its local cache before being permitted to receive the requested ESPN service.

One dilemma is that two distinct types of services exist, and these two types of services change at different rates. Conventional networks, however, are unable to account for differences in rates of change between these two service types. This inability forces users to endure updates and delays that are triggered by a service type the user has not selected.

A first of the service types is known as a real-time service. Real-time services are services that are expected to be on continuously. That is, real-time services are fairly static and thus, do not create frequent changes in flow-to-MLC mapping.

The second service type is non real-time services. Non real-time services are more dynamic and of shorter duration than real-time services. Non real-time services, therefore, change more frequently than real-time services and are more likely to trigger more frequent changes in the flow-to-MLC mapping.

FIG. 5 is an illustration of a flow description message 500 including a number of intermingled real-time and non real-time service flows, as processed in a conventional network system. In FIG. 5, for example, a conventional network user can select the service flow for CNN, which might be considered a real-time service flow. As indicated, CNN might have a flow ID of 100, a unique MLC ID of 20, a corresponding transmit mode (A), and a control sequence number of 1. Other service flows shown within the flow description message 500, might be considered non real-time and include flow IDs of 200, 300, and 600, respectively.

Since the non real-time service flows 200, 300, and 600 change more frequently than the real-time CNN service flow 100, the non real-time flows are able to share the same MLC ID. Thus, as shown in FIG. 5, the MLCs 200, 300, and 600 each use an MLC ID of 30. This MLC ID sharing between non real-time flows, such as the flows 200, 300, and 600, is possible because they are of short duration, for example less than 30 minutes. Once the flow 200 has ceased, the MLC ID 30 can be passed to the flow 300, and so on. Since the flows do change, however, the transmit modes, as well as the control sequence numbers, must also change. Thus, the flows 200, 300, and 600 are assigned sequence numbers 2, 3, and 4, respectively.

The flow description message in the illustration of FIG. 5, includes a final service flow ID 700 for ESPN. This final ESPN service flow is also a real-time flow having an MLC ID 50, transmit mode (E), and a control sequence number of 5.

In the conventional network, if a device is receiving the CNN flow 100 with the MLC ID 20 and tries to switch to the ESPN flow ID 700 with the MLC ID 50, a delay will occur. As noted above, before the device can switch from the CNN flow 100 to the ESPN flow 700, it will check the control channel 410 to compare the stored control sequence number with the current sequence number included in the array 416. As shown in FIG. 5, the control sequence number has been changed from "1" to "2," from "2" to "3," and then from "3" to "4", etc. These changes correspond to each of the service flows 200, 300, and 600, respectively. Consequently, the device will have to download the control protocol information related to transmit modes B-D, associated with the flows 200, 300, and 600, respectively. Since the control sequence numbers have changed, this information will have to be downloaded before the request for the ESPN flow 700 can be serviced. The present invention resolves this issue.

Figure 6:
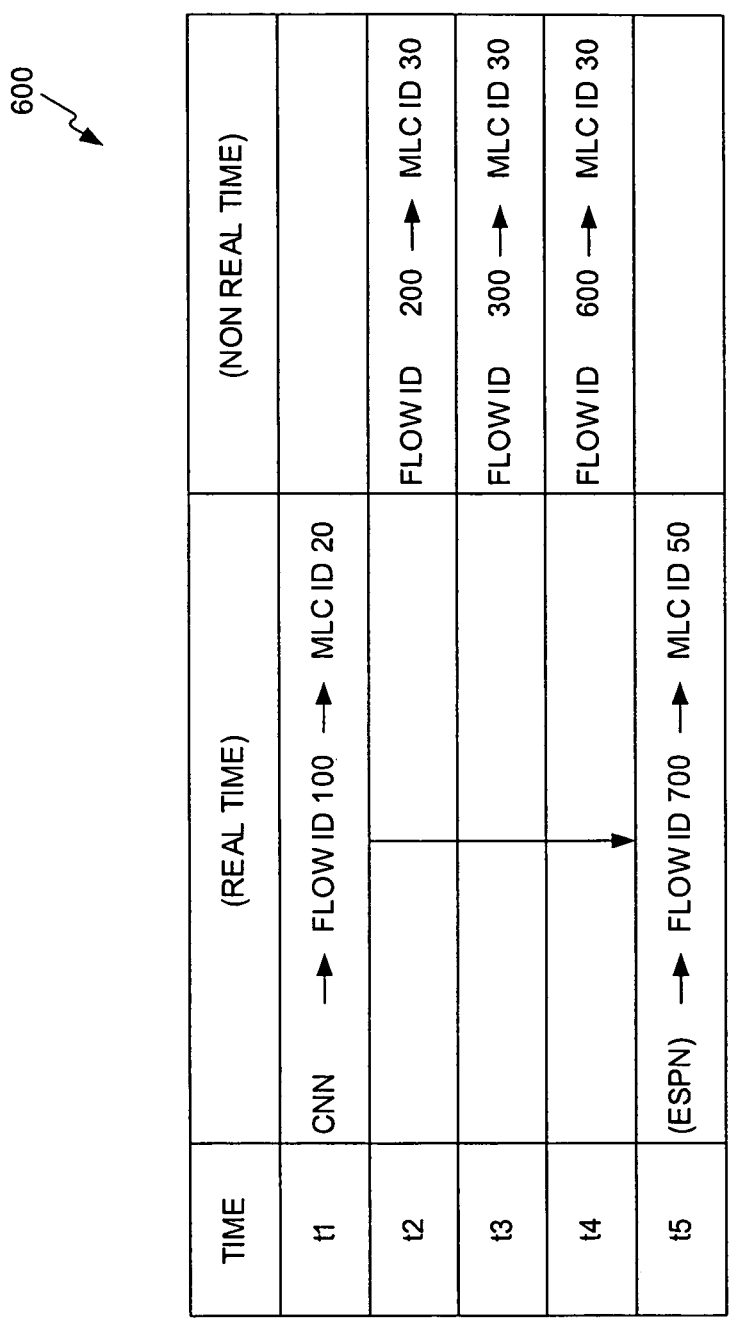
FIG. 6 is an illustration of an exemplary service ID message structured in accordance with the embodiment.

FIG. 6 is a more detailed illustration 600 depicting the concurrency between the real-time and non real-time services shown in the flow description message 500 of FIG. 5. In FIG. 6, for example, the real-time CNN flow 100 might occur over the entire time periods t1-t4. During these same time periods (t1-t4), the non real-time flows 200, 300, and 600 can also occur. At time t5, the user might switch from the CNN flow 100 to the ESPN flow 700. At the same time, the flow 600, that occurred at the time t4, discontinues.

The present invention accommodates this concurrency by separating real-time services from non real-time services. More specifically, the present invention assigns separate control sequence numbering systems for real time and non real-time services. These separate numbering systems are implemented by assigning different place holders to track and store the separate control sequence numbers (for each of the separate types of services) within a communications device.

FIG. 7 is an illustration of a flow description message 700 constructed in accordance with an embodiment of the present invention. The flow description message 700 modifies the flow description message 500 of FIG. 5 In FIG. 7, the control sequence numbers for the real-time services (e.g. the CNN flow 100 and the ESPN flow 700) are stored in a bin 0. The control sequence numbers for the non real-time services (e.g., the flows 200, 300, and 600) are stored in a bin 1. The nomenclature or numerical designation associated of an individual bin is immaterial to implementation of the present invention.

The exemplary flow description message 700 of FIG. 7 enables a device, such as the device 112, to respond separately to changes in the sequence numbers associated with real-time and non real-time services. For example, if a user of the device 112 is only concerned about real-time services, the device 112 can be configured to check the control channel 410 only when changes occur in the CNN flow ID 100 and the ESPN flow ID 700. More specifically, if the device 112 is receiving the CNN flow ID 100 and receives a request to provide the ESPN flow 700, it will not be required to download information from the control channel 410 because of changes in the non real-time services.

That is, the device 112 can specifically be configured to monitor only bin 0 (real-time) control sequence changes. As shown in FIG. 7, the bin 0 control sequence number does not change until time t5. Thus, although non real-time flows (200, 300, and 600) change at times t1 to t4, the device 112 does not care about these changes since it has been configured to monitor bin 0 only. Therefore, the device 112 will not experience delay due to the bin 1 control sequence number changes. That is, changes can now occur in the non real-time service (bin 1) without interrupting the user's service request for bin 0.

In the present invention, the flow description message (e.g., the exemplary message 700 of FIG. 7) includes the control protocol information required to perform the flow to MLC mapping. The flow description message is transmitted throughout the network 100 in units called control protocol packets (CPPs). More specifically, groups of CPPs are transmitted or received within a single super-frame, such as the super-frame 400 of FIG. 4, in entities known as control protocol capsules.

Figure 8:
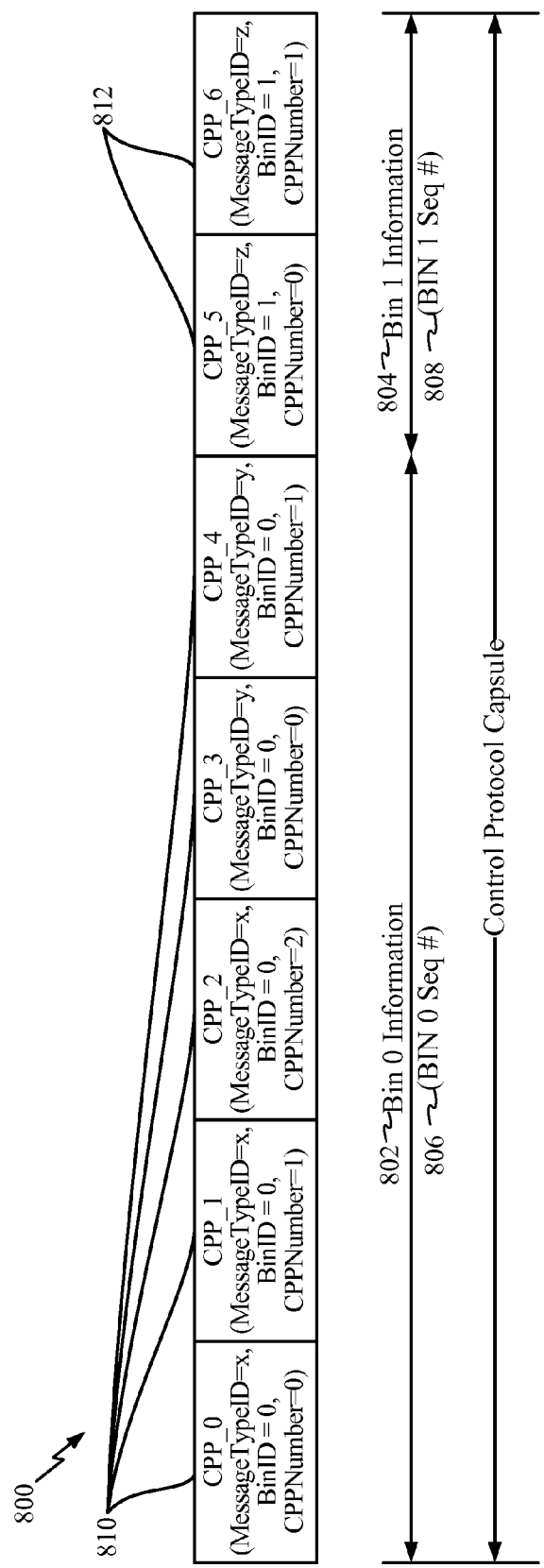
FIG. 8 is a block diagram illustration of an exemplary technique to resolve acquisition latency encountered in conventional networks.

FIG. 8 is an illustration of an exemplary control protocol capsule 800 structured in accordance with the present invention. As noted above, the present invention logically divides the control protocol information (e.g., control sequence numbers) for real-time and non real-time information into the separate bins (e.g., bin 0 and bin 1). This logical separation is implemented by dividing the control protocol capsule 800 across these same bins. As a result, the network 100 can separately receive and process separate sets of control protocol information.

In FIG. 8, for example, the control protocol capsule 800 is partitioned to include a bin 0 information portion 802 and a bin 1 information portion 804. The bin 0 information portion 802 is assigned its own unique sequence number 806 and the bin 1 information portion is assigned its own unique sequence number 808. The bin 0 information portion 802 includes bin 0 CPPs 810, each including specific control protocol information (e.g. message, bin ID, etc.). Similarly, the bin 1 information portion 804 of the capsule 800 includes bin 1 CPPs 812, each having its own control protocol information.

Figure 9:
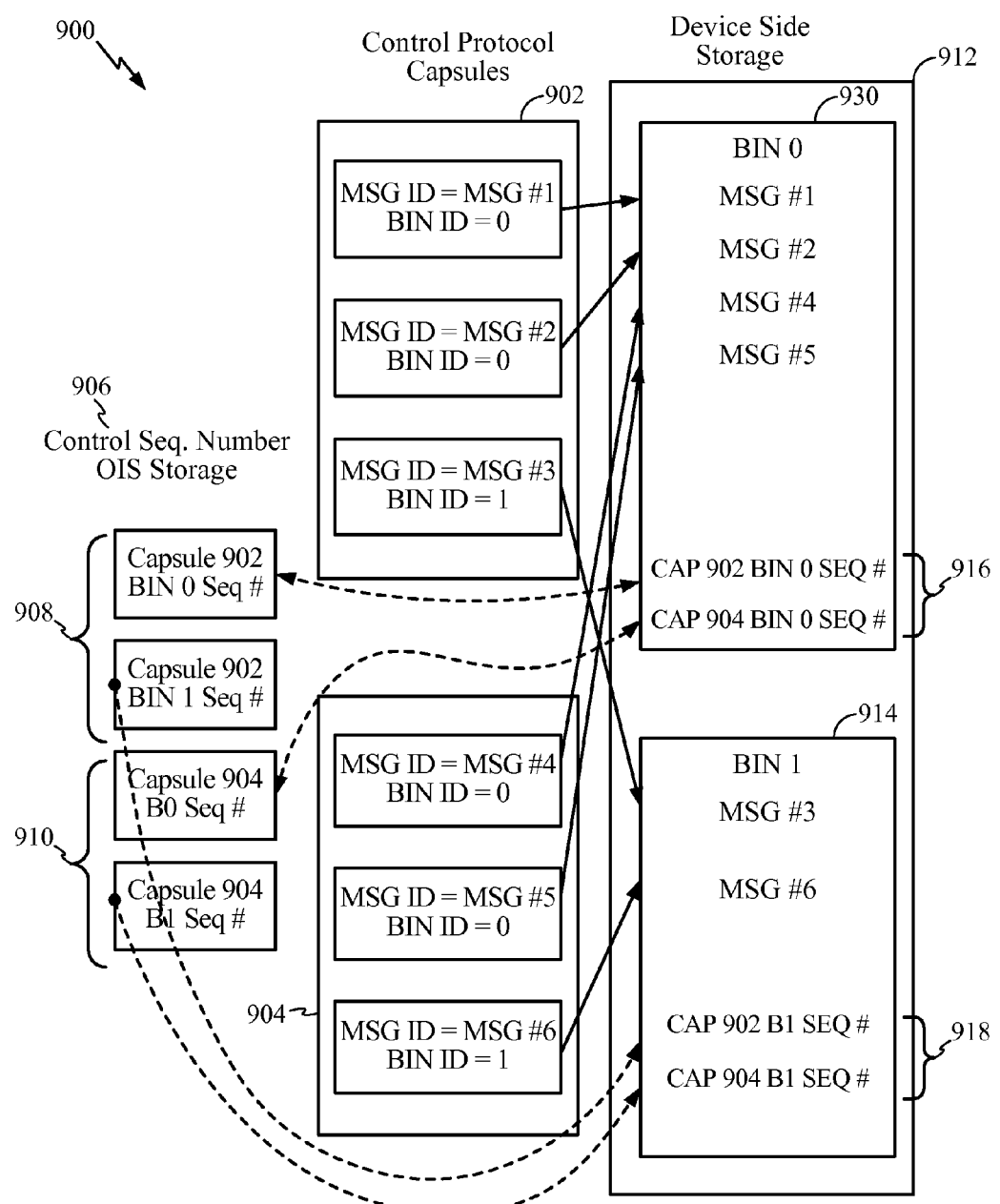
FIG. 9 is a more detailed illustration of the structure of the control protocol packet shown in FIG. 8.

FIG. 9 is an exemplary mapping 900 of how two exemplary control protocol capsules 902 and 906, each similar to the capsule 800, are stored and managed within the network 100, in accordance with the present invention. In FIG. 9, for example, control sequence numbers 906 associated with the capsules 902 and 904 are stored within the OIS channel 412 as indicated in a column 912. In the column 912, bin 0 and bin 1 sequence numbers associated with the first control protocol capsule 902 are separately stored in a first segment 908 of the OIS channel 412. Bin 0 and bin 1 sequence numbers associated with the second control protocol capsule 904 are separately stored in a second segment 910 of the OIS channel 412.

Within a device, such as the device 112, the control protocol information is partitioned and stored as a separate bin 0 section 930 and a bin 1 section 914. For example, all of the bin 0 sequence numbers from the control protocol capsules 902 and 904 are stored in a subsection 916 within the bin 0 section 930 of the device 112. All of the bin 1 sequence numbers from the control protocol capsules 902 and 904 are stored in a subsection 918 within the bin 1 section 914 of the device 112.

As also indicated in FIG. 9, all messages related to bin 0 from the control protocol capsules 902 and 904 are stored in the bin 0 section 930 of the device 112. All of the messages related to bin 1 from the control protocol capsules 902 and 904 are stored in the bin 1 section 914 of the device 112.

The independent storage and management of real-time and non real-time information within the network 100 and the device 112 improves the latency of the device 112.

Figure 10:
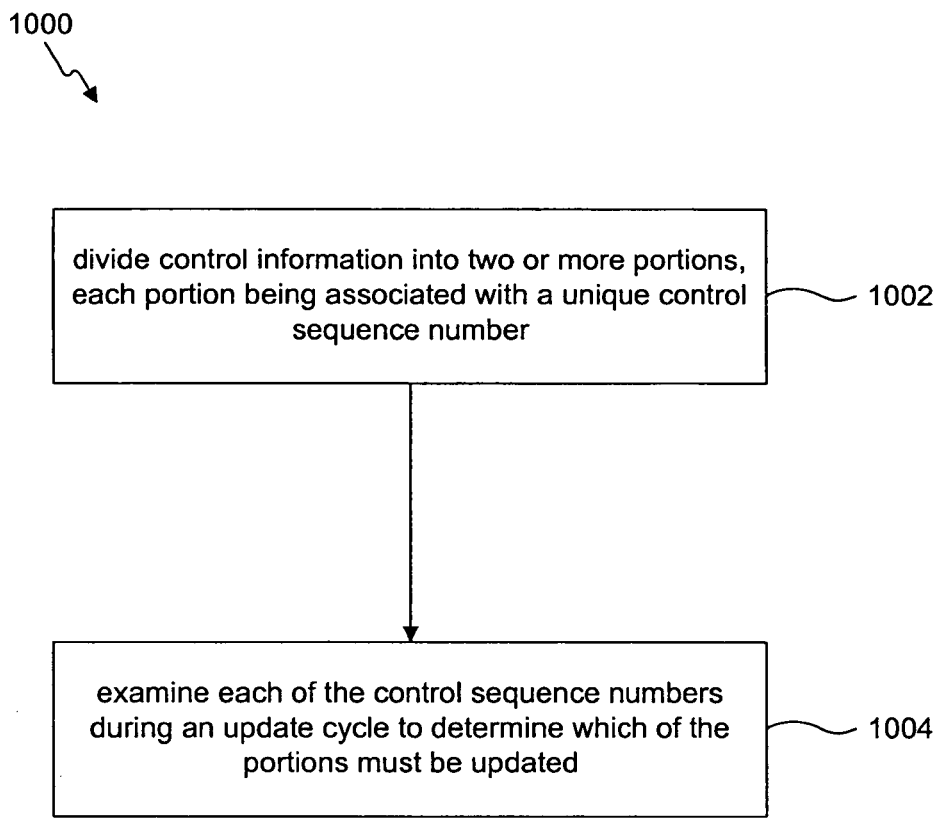
FIG. 10 is a flow diagram of an exemplary method of practicing the embodiment.

FIG. 10 is a flow diagram of an exemplary method 1000 of practicing an embodiment of the present invention. In FIG. 10 a method for managing device operation includes dividing control information into two or more portions, each portion being associated with a unique control sequence number as indicated in step 1002. Then each of the associated control sequence numbers is examined during an update cycle to determine which of the portions must be updated, as indicated in step 1004.

Figure 11:
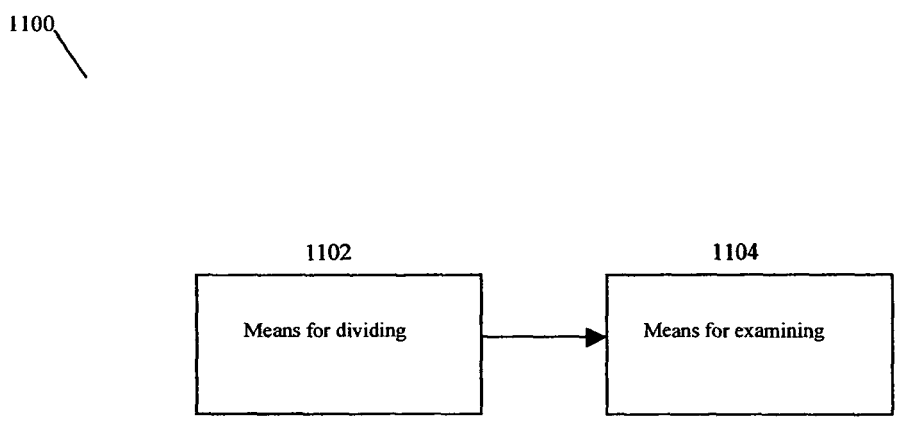
FIG. 11 is a block diagram of an apparatus constructed according to the embodiment.

FIG. 11 is a block diagram of an apparatus 1100 constructed according to the embodiment. In FIG. 11, the apparatus 1100 includes means for dividing 1102 for dividing control information into two or more portions, each portion being associated with a unique control sequence number. Mean for examining 1104 then examines each of the control sequence numbers during an update cycle to determine which of the portions must be updated.

In the present invention, control information transmitted by the network is logically divided into two bins. Depending on whether the control information relates to real-time or non-real-time media, the control information in the device is updated real-time, after interrupting the media communication, or in the background without interrupting the media communication. The latency of execution of operations that depend on having accurate control information is reduced by broadcasting the control information needed for latency sensitive device operations separately (i.e., in a separate bin) from control information needed for other device operations. The technique of the present invention is particular effective if the control information needed for latency sensitive device operations also does not change very frequently.

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by analog and/or digital circuits, discrete components, application-specific integrated circuits, firmware, processor executing appropriate software, and the like, or any combination thereof. Thus, the breadth and scope of the present invention should not be limited by any of the above-described exemplary embodiments, but should be defined only in accordance with the following claims and their equivalents.

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

The Detailed Description section should primarily be used to interpret the claims. The Summary and Abstract sections may set forth one or more, but not all exemplary embodiments of the present invention as contemplated by the inventor(s), and thus, are not intended to limit the claims.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

What is claimed is:

1. A method for managing mobile device operation, the method comprising:
    storing, in memory by a mobile device, control information for receiving and decoding real-time services and for receiving and decoding non real-time services provided by a network server, wherein the memory portion is configured to store control sequence numbers for service flows received by the mobile device from the network server;
    monitoring by the mobile device a control channel broadcasted by the network server, the control channel contains control information updates for a plurality of service flows provided by the network server, wherein the control information includes control sequence numbers for real-time service updates numbered in accordance with a first control sequence numbering system and control sequence numbers for non real-time service updates numbered in accordance with a second control sequence numbering system separate from the first control sequence numbering system;
    determining which service flow updates are currently required by the mobile device and for said service flows comparing control sequence numbers stored in the memory of the mobile device with the control sequence numbers identified in the control channel to determine if the required service flow updates are provided in the control channel; and
    extracting from the control channel only control information updates for the service flows currently required by the mobile device and updating control sequence numbers for said service flows in the memory.

2. The method of claim 1, wherein one or more real-time service flows are associated with a first logical channel carrying real-time content from the network server and one or more non real-time service flows are associated with a second logical channel carrying non real-time content from the network server.

3. The method of claim 1, wherein the memory of the mobile device stores a unique set of control sequence numbers for the real-time service flows and another unique set of control sequence numbers for non real-time service flows.

4. The method of claim 1, wherein the control channel includes at least two separate control protocol capsules (CCP) containing control information about service flows, wherein a first CCP contains control sequence numbers for real-time service flow updates and a second CCP contains control sequence numbers for non real-time service flow updates.

5. The method of claim 1, wherein determining which of the required service flows are provided in the control channel comprises determining which service flow updates are currently required by the mobile device and for said service flows comparing control sequence numbers stored in the memory of the mobile device with the control sequence numbers identified in the control channel.

6. The method of claim 1, further comprising updating in the memory control sequence numbers associated with the extracted control information.

7. The method of claim 1, further comprising:
    performing real-time updates of control information corresponding to the real-time services, after interrupting a media communication; and
    performing background updates of control information corresponding to the non real-time services, without interrupting the media communication.

8. The method of claim 1, wherein the control channel includes at least one control message that is logically divided into a first portion including the control information corresponding to the real-time services and a second portion including the control information corresponding to the non real-time services.

9. A method for providing control information, the method comprising:
    assigning separate control sequence numbering systems for real-time services and non real-time services provided by a network server to a mobile device;
    transmitting by the network server to the mobile device one or more real-time time service flows and one or more non real-time service flows; and
    transmitting by the network server to the mobile device a control channel containing control information updates for the one or more service flows transmitted by the network server, wherein the control information includes control sequence numbers for real-time service updates and separate control sequence numbers for non real-time service updates;

whereby a mobile device uses the separate control sequence numbering for real-time service updates and non real-time service updates to select from the control channel only control information updates for service flows currently required by the mobile device and to disregard the control information updates for service flows not currently required by the mobile device.

10. The method of claim 9, wherein the control channel includes at least two separate control protocol capsules (CCP) containing control information about service flows, wherein a first CCP contains control sequence numbers for real-time service flow updates and a second CCP contains control sequence numbers for non real-time service flow updates.

11. The method of claim 9, wherein the one or more real-time service flows are associated with a first logical channel carrying real-time content from the network server to the mobile device and the one or more non real-time service flows are associated with a second logical channel carrying non-real time content from the network server.

12. An apparatus for providing control information, the apparatus comprising:
    means for assigning separate control sequence numbering systems for real-time services and non real-time services provided by a network server to a mobile device;
    means for transmitting by the network server to the mobile device one or more real-time service flows and one or more non real-time service flows; and
    means for transmitting by the network server to the mobile device a control channel containing control information updates for the one or more service flows transmitted by the network server, wherein the control information includes control sequence numbers for real-time service updates and separate control sequence numbers for non real-time service updates;
    whereby a mobile device uses the separate control sequence numbering for real-time service updates and non real-time service updates to select from the control channel only control information updates for service flows currently required by the mobile device and to disregard the control information updates for service flows not currently required by the mobile device.

13. The apparatus of claim 12, wherein the control channel includes at least two separate control protocol capsules (CCP) containing control information about service flows, wherein a first CCP contains control sequence numbers for real-time service flow updates and a second CCP contains control sequence numbers for non real-time service flow updates.

14. A non-transitory computer readable storage medium having stored thereon processor-executable instructions configured to cause a processor of a mobile device to perform operations comprising:
    storing in a memory control information for decoding real-time services and non real-time services provided by a network server, wherein the memory is configured to store control sequence numbers for service flows received by a mobile device from the network server;
    receiving a control channel broadcasted by a network server, the control channel contains control information updates for a plurality of service flows provided by the network server, wherein the control information includes control sequence numbers for real-time service updates and separate control sequence numbers for non real-time service updates;
    determining which service flow updates are currently required by a mobile device and which of the required service flows are provided in the received control channel; and
    extracting from the control channel control information updates for the service flows currently required by the mobile device and disregarding control information updates for service flows not currently required by the mobile device.

15. The non-transitory computer readable storage medium of claim 14, having stored thereon further processor-executable instructions configured to cause a processor of the mobile device to perform operations comprising
    determining which service flow updates are currently required by the mobile device and for said service flows comparing control sequence numbers stored in the memory of the mobile device with the control sequence numbers identified in the control channel.

16. A communication system comprising: a communications component configured to receive a control channel broadcasted by a network server, the control channel containing control information updates for a plurality of service flows provided by the network server, wherein the control information includes control sequence numbers for real-time service updates and control sequence numbers for non real-time service updates, the control sequence numbers for the real-time service updates being numbered separately from the control sequence numbers for the non real-time service updates; and
    a memory; and
    a processor coupled to the memory and communication component, the processor configured to:
        store, in the memory, control information for receiving real-time services and non real-time services provided by a network server, wherein the memory is configured to store control sequence numbers for service flows received from the network server;
        determine which service flow updates are currently required by the communication system and which of the required service flows are provided in the received control channel; and
        extract from the control channel control information updates for the service flows currently required by the communication system and disregarding control information updates for service flows not currently required by the communication system.

17. The communication system of claim 16, wherein the memory of the mobile device stores a unique set of control sequence numbers for the real-time service flows and another unique set of control sequence numbers for non real-time service flows.

18. The communication system of claim 16, wherein the control channel includes at least two separate control protocol capsules (CCP) containing control information about service flows, wherein a first CCP contains control sequence numbers for real-time service flow updates and a second CCP contains control sequence numbers for non real-time service flow updates.

19. The communication system of claim 16, wherein the processor is further configured to:
    monitor the control channel for only the real-time service updates.

20. An apparatus for providing control information, the apparatus comprising:
    a memory; and
    a processor coupled to the memory and configured to:

assign separate control sequence numbering systems for real-time services and non real-time services provided by a network server to a mobile device;

transmit by the network server to the mobile device one or more real-time time service flows and one or more non real-time service flows; and transmit by the network server to the mobile device a control channel containing control information updates for the one or more service flows transmitted by the network server, wherein the control information includes control sequence numbers for real- time service updates and separate control sequence numbers for non real-time service updates;

whereby a mobile device uses the separate control sequence numbering for real-time service updates and non real-time service updates to select from the control channel only control information updates for service flows currently required by the mobile device and to disregard the control information updates for service flows not currently required by the mobile device.

21. A non-transitory computer readable medium having stored thereon processor-executable instructions configured to causes a processor to perfrom operations comprising:

assigning separate control sequence numbering systems for real-time services and non real-time services provided by a network server to a mobile device;

transmitting by the network server to the mobile device one or more real-time time service flows and one or more non real-time service flows; and transmitting by the network server to the mobile device a control channel containing control information updates for the one or more service flows transmitted by the network server, wherein the control information includes control sequence numbers for real-time service updates and separate control sequence numbers for non real-time service updates;

whereby a mobile device uses the separate control sequence numbering for real-time service updates and non real-time service updates to select from the control channel only control information updates for service flows currently required by the mobile device and to disregard the control information updates for service flows not currently required by the mobile device.

* * * * *